F. SYMANZIK.
SPINNING SPINDLE.
APPLICATION FILED MAR. 16, 1915.
1,180,338.
Patented Apr. 25, 1916.
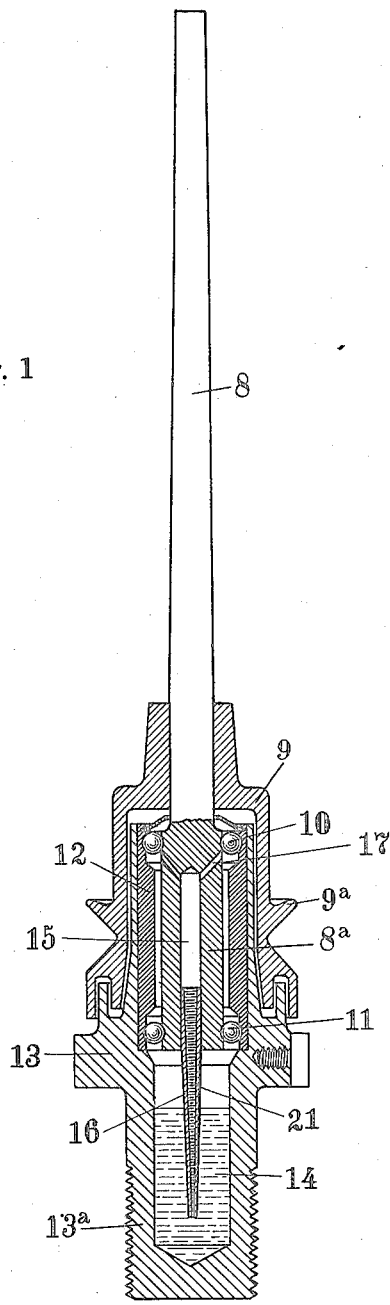
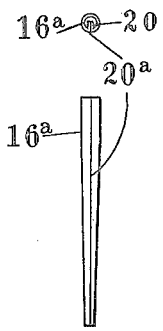
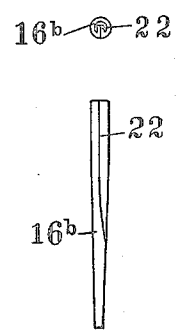
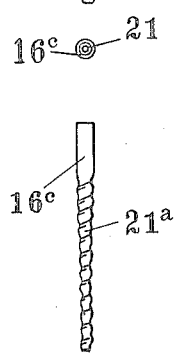
Witnesses
Inventor

UNITED STATES PATENT OFFICE.

FRANZ SYMANZIK, OF SCHWEINFURT, GERMANY.

SPINNING-SPINDLE.

1,180,338.  Specification of Letters Patent.  Patented Apr. 25, 1916.

Application filed March 16, 1915. Serial No. 14,736.

*To all whom it may concern:*

Be it known that I, FRANZ SYMANZIK, a subject of the King of Prussia, residing at No. 4 Gymnasiumstrasse, Schweinfurt, in Germany, have invented new and useful Improvements in Spinning-Spindles, of which the following is a specification.

The invention relates to spinning spindles or other quickly rotating vertical shafts with ball-bearings, and more particularly to a device for lubrication of said bearings.

Its object is to devise the lubricating appliance such that it is self-operating during the rotation of the spindle, but inoperative as long as the spindle is at rest.

The object is attained by providing channels of special arrangement in which the centrifugal force is active in such a manner that the liquid lubricant is forced upwardly and distributed into the ball-bearings, the centrifugal force being assisted through guiding means which not only lead the lubricant upwardly but also insure its perfect contact with the wall of the channels and consequently its rotation. The invention further includes a chamber for the lubricant below the bearings and ducts for leading the lubricant upwardly which will then flow through the bearings and back into the chamber in a continuous circulation.

Several embodiments of this invention are illustrated by way of example in the accompanying drawing which is to be taken as a part of this specification and in which—

Figure 1 is vertical sectional elevation of a spindle bearing and the lubricating device. Figs. 2 to 4 show the upper and side-views respectively of three modifications of a detail of the lubricating device.

Similar reference characters denote similar parts throughout all figures of the drawing.

The lower end of the spindle-shank 8 is provided with an enlargement or butt $8^a$ on the periphery of which a number of grooved raceways are worked out for a corresponding number of series of bearing-balls 10 and 11, respectively, sustained in similarly shaped race-grooves of a bushing 12, so that the spindle is concentrically supported, and held against axial displacement within said bushing that itself is non-rotatably located in a central bore or socket of the usual bolster 13. The latter can be fixed upon the spindle-rail of the spinning machine by any convenient means, for example, its lower cylindrical projection $13^a$ may be externally threaded (Fig. 1) and by a nut screwed thereupon be secured in the bore of the rail. A bell-formed casing 9 attached to the shank 8 and having a belt-pulley or whirl $9^a$ situated on its periphery, encircles the upper part of the bolster 13, thus protecting its interior and the ball-bearings from dust, filaments and the like. The lower projection $13^a$ of the bolster is recessed or hollowed out to form a chamber or receptacle 14 for the lubricant.

A comparatively large central bore 15 in the butt $8^a$ is at its upper end in open connection with the ball-bearing 10 through radial or sloping bores or ducts 17, and with the chamber 14 by a sleeve or tube 16 inserted into the lower end of said bore 15, the lower end of said tube being immersed into the lubricating oil contained in the chamber 14. This suction-tube 16 is preferably of tapering form or at least provided with a tapering bore the smaller opening of which is located below. Through this aperture the oil continually enters the bore of the tube 16 and will be carried with it in the quick rotation of the spindle, so that it will be driven by the centrifugal force upwardly on the tapering walls of that bore and within the channels 15 and 17. During the operation of the spindle a continual stream of lubricant is thus conducted upon the ball bearings which are abundantly lubricated, and will then pass downwardly on the bushing 12 back into the receptacle 14. On the contrary, no force capable of forcing the oil upwardly is active, when the spindle is at a standstill. The upward gradual increase of the width of the channels and the radial outlet 17 produce the said favorable effect of the centrifugal force.

In order that the oil will surely rotate with the suction-tube so that the centrifugal force can sufficiently get an influence upon the oil, there may be arranged in the interior of the suction-tube projections, for example, a lengthwise extending rib 20 (Fig. 2) made by rolling a triangular blank of sheet-metal to form a conical sleeve 16ª and bending one or both longitudinal edges 20 thereof inwardly, whereupon the cleft 20ª can be tightened by soldering or the like.

The upward flow of the lubricant produced by centrifugal force can be favored, when helical faces are arranged in the bore of the tube 16 or formed on the inner wall thereof. Those helical faces may present the form of screw-threads 21 cut in the tube (Fig. 1), or with a thin sleeve 16ᶜ of metal the screw faces can be produced by folding a helical circumferential groove 21ª in the wall of the tube (Fig. 4). Moreover, the helical threads can be given a very elongated pitch, to resemble the aforesaid longitudinal rib, in which case a sleeve 16ᵇ bent of sheet-metal is twisted, which will cause the inwardly extending rib 22 to assume the shape of a screw thread (Fig. 3). Of course, the helical direction or ascention of the thread or threads will be dependent upon the sense of rotation of the spindle. The use of these screw faces greatly helps the action of the centrifugal force in driving the lubricant upwardly, and therefore it is possible to dispose the means in convenient arrangement, as the case may be, to impel and feed a sufficiently large stream of lubricant which secures the required lubrication of the ball-bearings.

Besides the advantages of the device that the lubrication takes place only during the rotation of the spindle and that in spite of a good lubrication constantly maintained, any waste of oil is avoided, the location of the oil-receptacle below favors the cleaning of the oil, as solid substances will sink and be removed from the circuit. Moreover the appliance is simple in construction and consumes only a small quantity of oil for a long period.

In the foregoing specification a number of examples have been described for the purpose of evidence that the invention can be embodied in different ways without departing from its principle. I, therefore, declare that I do not wish to be limited to the constructions illustrated, but What I broadly claim as my invention is—

1. In combination with an oil chamber, a vertical spindle revolubly mounted thereon and a hollow suction tube carried by said spindle adapted to draw lubricant from said chamber and conduct it to said bearings.

2. In combination with an oil chamber, a vertical spindle revolubly mounted thereon and provided with anti-friction bearings, and a suction tube carried by said spindle adapted to draw lubricant from said chamber and conduct it to said bearings, the internal width of said tube gradually decreasing downwardly.

3. In combination with an oil chamber, a vertical spindle revolubly mounted thereon and provided with anti-friction bearings, and a suction tube carried by said spindle and having its lower end immersed in the lubricant, the internal width of said tube gradually decreasing downwardly and the internal surface thereof being provided with means adapted to facilitate the upward passage of oil therein during rotation thereof.

4. In combination with an oil chamber, a vertical spindle revolubly mounted thereon and provided with anti-friction bearings, and a suction tube carried by said spindle and having its lower end immersed in the lubricant, the internal width of said tube decreasing downwardly and the internal surface thereof being provided with a helical groove, whereby the upward passage of oil is facilitated during rotation of the spindle.

5. In a lubricating device for the bearings of vertical spindles, the combination with a spindle and bearings therefor; said spindle having a longitudinal bore and discharge ducts at the upper end thereof communicating with the bearings, of an oil chamber located below the spindle, and means carried by and extending from the lower end of said spindle into the oil chamber adapted to draw oil therefrom and carry it to the bearings.

6. In lubricating device for the bearings of vertical spindles, the combination with a spindle and bearings therefor; said spindle having a longitudinal bore and discharge ducts at the upper end thereof communicating with the bearings, of an oil chamber located below the spindle, and a suction tube extending from the lower end of said spindle into said oil chamber, said suction tube being provided with means adapted to facilitate the upward flow of lubricant therein during rotation of the spindle.

7. In a lubricating device for the bearings of vertical spindles, the combination with a spindle and bearings therefor; said spindle having a longitudinal bore and discharge ducts at the upper end thereof in communication with the bearings, of an oil chamber located below the spindle, and a suction tube extending from the lower end of said spindle into said lubricant chamber, helical grooves being provided in the inner wall of said tube whereby the ascent of lubricant therein is facilitated during rotation thereof.

8. In combination with an oil chamber, a vertical spindle revolubly mounted thereon and provided with an upper and a lower bearing, the butt of said spindle being chambered and provided with apertures leading from said chamber to said upper bearing, a bushing surrounding the spindle butt and providing a passageway from the upper to the lower bearing, together with means carried by the spindle for drawing lubricant from said chamber and conducting it to said bearings, substantially as described.

In testimony whereof I have signed my name to this specification in the presence of two subscribing witnesses.

FRANZ SÝMANZIK.

Witnesses:
S. HINZE,
T. ZIMMERLIN.